Feb. 2, 1965  G. WINTRISS  3,167,951
SENSING APPARATUS WITH SELF-POSITIONING SUPPORT
Filed June 5, 1961
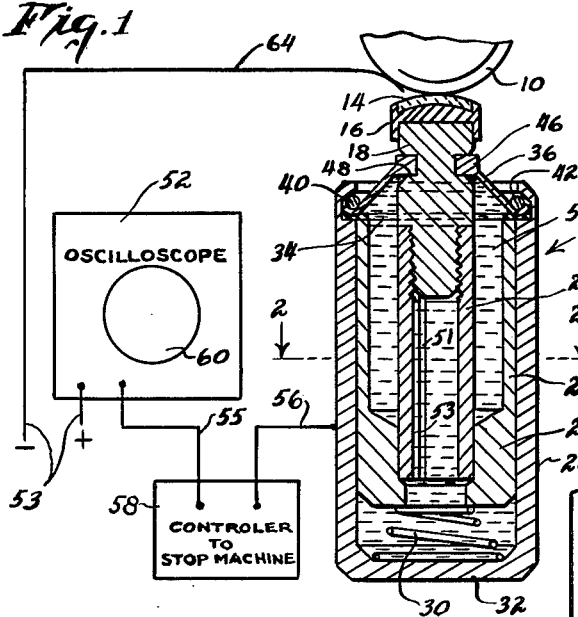
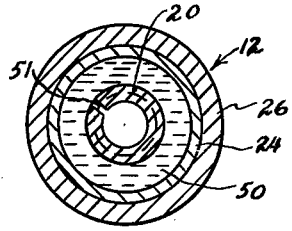
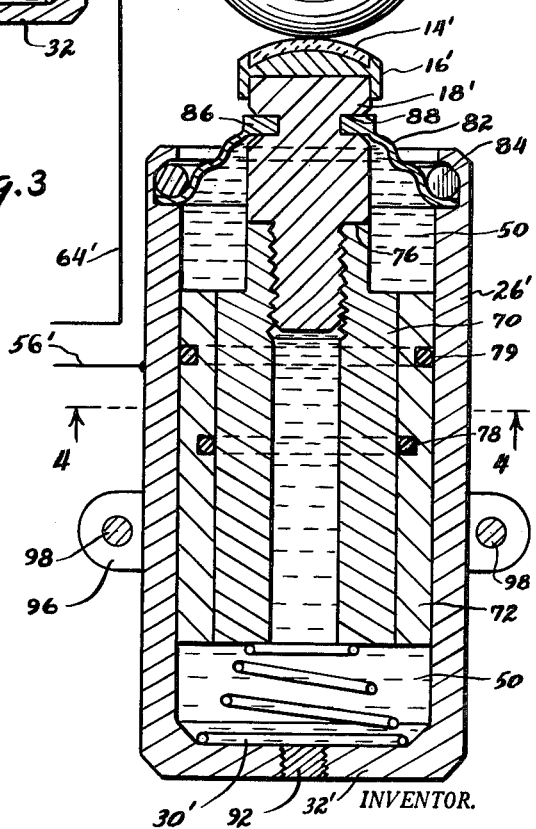
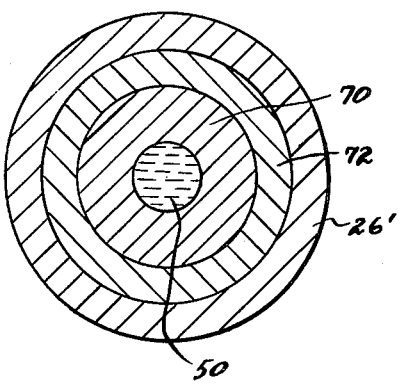
INVENTOR.
George Wintriss
BY Emery, Whittemore,
Sandoe & Graham
ATTORNEYS

United States Patent Office

3,167,951
Patented Feb. 2, 1965

3,167,951
SENSING APPARATUS WITH SELF-POSITIONING SUPPORT
George Wintriss, Carversville, Pa.
Filed June 5, 1961, Ser. No. 114,989
11 Claims. (Cl. 73—71.4)

This invention relates to sensing apparatus for detecting a change in conditions of operation of mechanical equipment, and more especially for equipment that operates at high speeds. With such equipment, a sudden change in speed or the setting up of vibrations in the mechanism may be an indication of trouble and danger of damage to the equipment if the operation is allowed to continue.

It is an object of this invention to provide improved apparatus for detecting the setting up of vibrations or other changes in the operation of a machine, and especially changes in the operation of a rotating part. The invention includes a self-positioning element that is in contact with the rotating part.

The expression "self-positioning" is used herein to designate an element that slowly creeps back toward a position from which it is displaced, there being an opening for gradual escape of fluid that is opposing said return to a position toward which the element has a bias, whereby the transducer assumes a position dependent upon the fluid viscosity and the force of the bias.

So long as the pressure of the rotating part against the self-positioning element is constant, the indication from the sensor is normal, but with any change in this pressure, the response of the self-positioning element is too slow to compensate immediately and, the response of the self-leveling element is too slow to compensate immediately and a signal is produced that warns the attendant in charge of the equipment, or the signal can be used to operate an automatic stop.

It is another object of the invention to detect changes in operating conditions for high-speed equipment by exerting pressure against a piezo-electric device and utilizing changes in the pressure for indicating changes from a standard voltage pattern.

Another object is to provide apparatus that detects changes in operating conditions of rotary equipment and that is substantially unaffected by centrifugal force when the sensing device and the equipment on which it is used rotate as a unit about a center in addition to the rotary motion in which departures from normal are to be sensed.

Other objects, features and advantages of the invention will appear or be pointed out as the description proceeds.

In the drawing, forming a part hereof, in which like reference characters indicate corresponding parts in all the views;

FIGURE 1 is a diagrammatic view, partly in section, showing a sensing and detection device made in accordance with this invention;

FIGURE 2 is a sectional view taken on the line 2—2 of FIGURE 1;

FIGURE 3 is a sectional view showing a modification of the invention which is substantially unaffected by centrifugal force; and FIGURE 4 is a sectional view taken on the line 4—4 of FIGURE 3.

The apparatus shown in FIGURE 1 is located in contact with a rotating part 10 of the mechanism on which the invention is used. There is a sensing device 12 including an electric transducer, preferably a piezo-electric crystal 14, attached to a holder 16 at the upper end of a self-positioning support 18. This support 18 has its lower end screwed into a piston rod 20.

A piston 22 is attached to the lower end of the piston rod 20, and this piston has a skirt 24 extending upwardly within a cylinder 26 in which the piston moves up and down.

A spring 30 is compressed between the lower face of the piston 22 and an end wall 32 of the cylinder 26. This spring 31 urges the piston 22 upwardly in the cylinder 26. The upward movement of the piston 22 is limited by a ring 34 which fits into a groove in the cylinder wall. This ring 34, which is preferably a metal snap ring, serves as an abutment for the upper end of the skirt 24.

A flexible diaphragm 36, preferably made of rubber, has its lower peripheral edge clamped against the ring 34 by a snap ring 40. This snap ring 40 bears against a frusto-conical surface 42 of the groove in the wall of the cylinder 26, and the contact with the sloping surface 42 gives the snap ring 40 a component of force in a downward direction against the partially-rolled-up circumference of the diaphragm 36, and in a direction parallel to the axis of the cylinder 26.

The diaphragm 36 has a center opening for passage of the self-positioning support 18. There is a lip 46 around the inner edge of the diaphragm 36 and of a cross section to fit snugly in a circumferential groove 48 in the self positioning support 18.

The interior of the cylinder 26 is filled with liquid 50 and this liquid can flow from one side to the other, of the piston 22, in response to movement of the piston in the cylinder 26. This movement of the liquid 50 is made possible by providing an opening through which spaces on opposite sides of the piston communicate with one another. In the construction shown, this opening is a slot 51 in the piston rod 20, the slot 51 also serves the purpose of providing some resilience for the piston rod 20 so that it can be pressed into a counter-bore 53, in the piston 22, with a press fit. This resilience also makes possible the use of wider manufacturing tolerances for the threads in the upper part of the piston rod 20 at the lower end of the support 18.

In order to obtain additional space for the volume of liquid 50 within the cylinder 26 and below the diaphragm 36, the downwardly-sloping annular face of the diaphragm 36 bows upwardly along its radius to accommodate liquid displaced by downward movement of the support 18. A limited amount of such downward movement is produced when the sensing unit is secured in place with the crystal 14, or other surface at the top of the holder 16 in contact with the rotating part 10. The self-positioning feature makes it unnecessary to locate the sensing unit with precision accuracy and makes the unit adjust itself to minor changes of position such as occur from thermal changes.

In the circuit shown in FIGURE 1, an oscilloscope 52 is connected on one side with a power line 53, and connected on the other side with the cylinder 26. In the preferred construction, this connection is made by conductors 55 and 56 and with an automatic controller 58 for stopping the machine in response to any substantial variation in the voltage of the circuit. The oscilloscope has a screen 60 indicating the voltage from the sensor and any changes in this voltage.

The cylinder 26 and the rest of this sensing device is grounded through the crystal 14 on the rotating part 10 which is connected by a conductor 64 with the ground side of the power line 53.

Any vibration of the rotating part 10 causes a change in pressure against the crystal 14, and if the vibration is substantial it displaces the crystal 14 and its holder 16 and support 18 downwardly. As the part 10 continues to rotate after this downward displacement, the recovery of the position of the crystal 14, by virtue of the upward pressure of the spring 30, is too slow to follow the vibration of part 10, and the circuit is temporarily broken. This slow recovery results from the viscosity of the liquid 50. For very slow operation, the liquid 50 is one having a viscosity as high as 2,500,000 centistokes.

Since the pressure of the rotating part 10 against the piezo-electric crystal 14 produces a voltage which changes with the pressure, there will be a change in the voltage indicated by the oscilloscope 52 and a change in voltage on the controller 58, even when the rotating part 10 maintains some contact with the crystal. When the vibration is sufficient to break the circuit, a maximum drop in voltage results.

The controller 58 is adjusted so as not to operate so long as the voltage change remains within a preselected limit, but if the voltage change becomes wider, then the controller 58 operates as an automatic stop for the equipment by which the eccentric 10 is rotated.

With proper amplification, the crystal 14 can be used as the only source of voltage, but it will be understood that in the embodiment illustrated in FIGURE 1, the crystal 14 is representative of electrical transducers, and various types can be used; or the apparatus can be employed with no transducer in contact with the rotating part 10. In such a case, the top surface of the holder 16 or the support 18 bears against the rotating part 10 and while the system is less sensitive to pressure changes, it can be operated by breaking the circuit when vibration causes that result.

Changes in the voltage are indicated on the oscilloscope screen 60, and they can be used to signal the operator where there is no automatic stop.

FIGURE 3 shows a modified form of the invention. A rotating part 10′ exerts pressure against a piezo-electric crystal 14′ secured to a holder 16′, at the upper end of a self-positioning support 18′. These parts are similar to the construction shown in FIGURE 1, and so is the cylinder which is indicated by the reference character 26′. The construction within the cylinder, however, is different. At its lower end, the support 18′ screws into an annular piston or inner sleeve 70; and this inner sleeve has a sliding fit in another annular piston or outer sleeve 72, which slides in the cylinder 26′.

Seals are provided for preventing liquid 50, in the upper end of the cylinder 26′, from having any communication with similar liquid in the lower end of the cylinder. There is a gasket 76 clamped between the upper end of the sleeve 70 and a shoulder of the support 18′ for preventing leakage of liquid along the threads that connect the sleeve 70 and the support 18′. There is a ring 78 for preventing leakage of liquid between the inner sleeve 70 and the outer sleeve 72. A split ring 79 prevents leakage of liquid between the outer sleeve 72 and the inside wall of the cylinder 26′. In the construction illustrated, both of the rings 78 and 79 are located in circumferential grooves in the inside and outside faces, respectively, of the sleeve 72; but it will be understood that these sealing rings may be in grooves in the inner sleeve 70 and wall of the cylinder 26′.

The upper end of the cylinder 26′ is closed by a flexible diaphragm 82 held in a groove of the cylinder wall by a spring snap ring 84. There is an opening through the center of the diaphragm 82 for passage of the support 18′; and there is a lip 86 on the diaphragm 82 and fitting tightly within a circumferential groove 88 in the support 18′.

A spring 30′, compressed between the lower end of the sleeve 70 and an end wall 32′, urges the sleeve 70 upwardly. There is a plug 92 in the end wall 32′ for initially filling the lower part of the cylinder with liquid.

When the spring 30′ pushes the sleeve 70 upwardly, this causes the sleeve 72 to move downwardly since the volume of liquid below the sleeves 70 and 72, and within the sleeve 70, remains constant. Likewise, any downward movement of the sleeve 70, by the eccentric 10′, causes the sleeve 72 to move upwardly to accommodate the liquid displaced by the downward movement. The diaphragm 82 is flexible and yields to accommodate displacement of liquid in the upper part of the cylinder, but there is no means provided for accommodating liquid displaced in the lower part of the cylinder except by relative movement of the sleeves 70 and 72 in opposite directions.

This construction illustrated in FIGURE 3 makes it possible to have the pressure sensor substantially unaffected by centrifugal force which may result from pitching of a ship, aircraft, or space craft or from turning of any vehicle in which the invention is used. Since displacements of either the sleeve 70 or 72 in one direction causes displacement of the other in the opposite direction, this correlation can be used to balance any centrifugal force which would otherwise influence the operation of the sensor. The parts are correlated so that the pressure exerted by the sleeve 70, and the lower end of the support 18′ against the liquid 50 in the lower end of the cylinder as the result of centrifugal force on the sleeve 70 and support 18′, is the same as the pressure exerted by the sleeve 72 against the liquid 50 in the lower end of the cylinder and as the result of the same centrifugal force.

The centrifugal forces with which this invention is concerned are about centers of rotation that are spaced substantial distances from the cylinder 26′. The difference in the distance of the sleeves 70 and 72 from the center of rotation, as a result of some changes in their relative positions in the cylinder, is actually a very small percentage of the total radius; and centrifugal effects are, therefore, substantially equal.

When a craft is pitching about its center of gravity and the cylinder 26′ is close to the center of gravity, there is little or no centrifugal force to be compensated. When an aircraft is looping or turning about a center at a distance from the craft, substantial centrifugal effects may result and these are compensated by the structure of FIGURE 3, and the pressure sensor operates without effect from this force.

This balance is obtained by having each sleeve 70 or 72, and the weight of any structure secured thereto, equal to that of the other sleeve 70 or 72 and of equal effective area of contact with the liquid. When the sleeves and any structure secured to them are not of equal weight, then the lighter sleeve must have a larger effective area of contact so that the product of the weight of the sleeve with its connected structure, when multiplied by its effective area of contact with the liquid, is equal to the product of the weight and the effective area of contact of the other sleeve.

The apparatus shown in FIGURE 3 can be used in the same circuit as the apparatus shown in FIGURE 1, and corresponding conductors are indicated by the same reference characters with a prime appended.

The cylinder 26′ has tabs 96 extending from it on the outside at diametrically-opposite locations. These tabs are used to hold the cylinder 26′ in a set position with respect to the axis of rotation of the rotating part 10′; bolts 98 being placed through openings in the tabs 96 for this purpose.

The preferred embodiment has been illustrated and described. Terms of orientation are, of course, relative. Various changes and modifications can be made and some features can be used in different combinations without departing from the invention as defined in the claims.

What is claimed is:

1. Apparatus for detecting change in the operating conditions of a rotating part including a transducer for operative contact with the circumference of the rotating part, an electric circuit responsive to the effective pressure of the transducer with said rotating part, a holder for the transducer, a support for the holder, the support including cylinder and piston elements, means biasing one of said elements in a direction to move the transducer toward the rotating part, the cylinder containing a fluid that prevents rapid relative movement of the piston element in the cylinder element of the support in a direction to return the transducer toward the rotating part when said transducer and its holder are displaced against said bias by radial movements of the rotating part, the fluid having a viscosity that limits the relative movement of the holder toward the rotating part to a speed substantially less than the vibration displacement speed resulting in a break of the circuit between the transducer and the rotating part to thereby indicate change in the operating conditions above a predetermined limit.

2. The combination described in claim 1 and in which the transducer is a piezo crystal.

3. The combination described in claim 1 and in which the piston element is urged toward its original position by a spring, and the fluid in the cylinder limits the return movement to a rate at least as low as 0.030 inch per second.

4. The combination described in claim 3 and in which the viscosity of the fluid limits return movement of the support to between 0.001 or less and 0.030 inch per second.

5. The combination described in claim 1 and in which an electric circuit leads from the transducer to a fixed structure including a stop controller, and there are means in the controller responsive to voltage changes in the circuit resulting from pressure by the rotating part against the transducer, the controller being adjusted so as not to operate so long as the voltage changes remain within a preselected limit, but being operative by voltage wider than said limit.

6. The combination described in claim 5 and in which the indicating means is an electrical oscilloscope.

7. The combination described in claim 1 and in which the transducer is a piezo crystal in an electric circuit and there are indicating means responsive to changes in the voltage in the electrical circuit.

8. The combination described in claim 1 and in which the piston element is of a longitudinal extent equal to more than half the length of the cylinder, and there is a stop at one end of the cylinder, a spring between the piston element and the other end of the cylinder urging the piston element against the stop, and an opening through the piston element for flow of fluid from one side of the piston to the other as the piston element moves in the cylinder.

9. The combination described in claim 8 and in which the piston element has a rod portion that extends beyond the stop, and an annular diaphragm secured to the cylinder around the circumference of the diaphragm and secured to the rod portion around the inner edge of the diaphragm.

10. The combination described in claim 1 and in which the self-positioning support includes a piston rod which is hollow and open at its lower end for connection with the cylinder below the piston, and the piston rod has a longitudinally-extending slot therein through which the interior and rod communicates with the portion of the cylinder above the piston, said slot also providing radial resilience for the piston rod, and said rod fitting into the piston with a press fit.

11. Sensing apparatus which may be subject to angular movement about a center remote from the apparatus including an element that is moved in response to motion that is to be sensed, a support for said element including a piston rod, a cylinder into which the piston rod extends, two pistons in the cylinder and each of which extends across a portion of the cross-section of the cylinder, one of which is connected to the piston rod and each of which is movable axially on the cylinder, a viscous liquid in a closed end of the cylinder with which both pistons are in contact whereby displacement of one piston in one direction transmits pressure through the liquid to displace the other piston in the opposite direction, the weight of both pistons and any structure secured thereto multiplied by the effective area of contact of the piston with the liquid being equal so that they are substantially equally affected by centrifugal force if the apparatus moves about said center, and a spring urging the rod-connected piston in the direction toward the said element.

References Cited in the file of this patent

UNITED STATES PATENTS

| | | |
|---|---|---|
| 1,114,307 | Stimpson | Oct. 20, 1914 |
| 2,359,158 | Rushing et al. | Sept. 26, 1944 |
| 2,661,622 | Severs | Dec. 8, 1953 |
| 2,770,741 | Vore et al. | Nov. 13, 1956 |
| 2,919,883 | Murphy | Jan. 5, 1960 |